US008605883B2

(12) United States Patent
Litteaut et al.

(10) Patent No.: US 8,605,883 B2
(45) Date of Patent: Dec. 10, 2013

(54) METHOD AND EQUIPMENTS FOR ESTABLISHING TELECOMMUNICATION

(75) Inventors: Jacques Litteaut, Marly le Roy (FR); Stéphane Coulon, Colombes (FR); Jean-François Rey, Brest (FR)

(73) Assignee: Alcatel Lucent, Paris (FR)

( * ) Notice: Subject to any disclaimer, the term of this patent is extended or adjusted under 35 U.S.C. 154(b) by 216 days.

(21) Appl. No.: 12/433,424

(22) Filed: Apr. 30, 2009

(65) Prior Publication Data
US 2010/0002851 A1 Jan. 7, 2010

(30) Foreign Application Priority Data
May 7, 2008 (EP) .................................... 08290437

(51) Int. Cl.
*H04M 3/42* (2006.01)
(52) U.S. Cl.
USPC .................................. 379/210.01; 379/215.01
(58) Field of Classification Search
USPC ................ 379/210.01, 209.01, 215.01, 93.35
See application file for complete search history.

(56) References Cited

U.S. PATENT DOCUMENTS

| | | | | | |
|---|---|---|---|---|---|
| 4,947,421 | A | * | 8/1990 | Toy et al. ..................... | 379/67.1 |
| 5,008,929 | A | * | 4/1991 | Olsen et al. .............. | 379/114.28 |
| 5,268,957 | A | * | 12/1993 | Albrecht ................. | 379/209.01 |
| 5,425,091 | A | * | 6/1995 | Josephs .................... | 379/209.01 |
| 5,784,438 | A | * | 7/1998 | Martinez ..................... | 379/67.1 |
| 5,894,504 | A | * | 4/1999 | Alfred et al. ............... | 379/88.13 |
| 5,995,848 | A | * | 11/1999 | Nguyen ........................ | 455/528 |
| 6,009,157 | A | * | 12/1999 | Bales et al. .............. | 379/209.01 |
| 6,035,031 | A | * | 3/2000 | Silverman ................ | 379/209.01 |
| 6,456,842 | B1 | | 9/2002 | Subramanian et al. | |
| 6,661,886 | B1 | * | 12/2003 | Huart et al. ............... | 379/215.01 |
| 6,735,295 | B1 | * | 5/2004 | Brennan et al. .......... | 379/215.01 |
| 7,088,802 | B2 | * | 8/2006 | Light et al. ................. | 379/88.17 |
| 7,469,044 | B2 | * | 12/2008 | Kramarz-Von Kohout | 379/209.01 |
| 7,480,260 | B1 | * | 1/2009 | Vashisht et al. ............... | 370/260 |
| 7,853,001 | B2 | * | 12/2010 | Shaffer et al. ............ | 379/209.01 |
| 2004/0028204 | A1 | * | 2/2004 | Crook ....................... | 379/211.01 |
| 2006/0245567 | A1 | * | 11/2006 | Shaffer et al. ............ | 379/209.01 |
| 2008/0139180 | A1 | * | 6/2008 | Mills .......................... | 455/414.1 |

FOREIGN PATENT DOCUMENTS

EP 0 781 024 A2 6/1997
WO WO 2006/073382 A1 7/2006

OTHER PUBLICATIONS

European Search Report.

* cited by examiner

*Primary Examiner* — Olisa Anwah
(74) *Attorney, Agent, or Firm* — Fay Sharpe LLP

(57) ABSTRACT

The present invention relates to a method for establishing telecommunication between at least a first and a second users within a telecommunication network comprising the following steps:
  receiving a request from said first user to set up a telecommunication with said second user,
  monitoring telecommunication activity in accordance with said request to detect a telecommunication activity of said second user with a third user different from said first user, and, in case of detection of said telecommunication activity of said second user, setting up a telecommunication between said first and second users after the end of said telecommunication activity of said second user with a third user different from said first user. The invention also relates to devices for performing the method.

14 Claims, 3 Drawing Sheets

| Request reference | Notifying users | | Monitoring users | | Date | Status |
|---|---|---|---|---|---|---|
| | Name | Number | Name | Number | | |
| XX001 | Alice | « 0102056186 » | Bob | « 04562231464 » | 19/01/08 | Pending |
| XX032 | Alice | « 0102056186 » | Richard | « 0102056192 » | 16/01/08 | Pending |

Fig.3

| Request reference | Notifying users | | Monitoring users | | Date | Status |
|---|---|---|---|---|---|---|
| | Name | Number | Name | Number | | |
| XX001 | Alice | « 0102056186 » | Bob | « 04562231464 » | 19/01/08 | Processed(23/01/08) |
| XX032 | Alice | « 0102056186 » | Richard | « 0102056192 » | 16/01/08 | Processed(22/01/08) |

Fig.4

METHOD AND EQUIPMENTS FOR ESTABLISHING TELECOMMUNICATION

BACKGROUND OF THE INVENTION

The present invention relates to the field of telecommunication management especially in the case of workflow management.

Telecommunication has become a crucial issue for the companies due to globalization and the need for companies to work with persons in remote locations. Workflow management is used by the companies in order to improve and accelerate file processing. Indeed, computational programs are used to send notifications to the persons working on a common project to inform them of the updates or changes concerning the file. Nevertheless, to find agreements or to solve problems occurring on a project, direct telecommunications between the different collaborators may be needed. Managing to be in touch with a collaborator, especially if said collaborator is employed by a different company can be difficult and time consuming (collaborator on line, busy or on vacations, messages not received, . . . ). Thus, the time wasted by the employees of the company and the delays in the file processing can decrease the global productivity of the company.

To cope with this problem, network communication companies have developed automatic call-back systems. These systems allow, in the case when the interlocutor is already on line, to be registered and recalled as soon as the interlocutor's call has ended. Nevertheless, such systems are efficient only if the interlocutor is already on line but is not efficient in the case when said collaborator is out of his/her office for example.

SUMMARY OF THE INVENTION

It is an object of the present invention to overcome the precited drawbacks of the state of the art and provide a method for establishing telecommunication between at least a first and a second users within a telecommunication network comprising the following steps:
  receiving a request from said first user to set up a telecommunication with said second user,
  monitoring telecommunication activity in accordance with said request to detect a telecommunication activity of said second user with a third user different from said first user,
  and, in case of detection of said telecommunication activity of said second user, setting up a telecommunication between said first and second users after the end of said telecommunication activity of said second user with said third user different from said first user Preferentially after reception of said request from said first user, the method comprises an additional step of registering said first user with a notification status and said second user with a monitoring status.

Advantageously said method also comprises, after detection of a telecommunication activity of said second user, the steps of:
  sending a message to said detected second user about a coming telecommunication set up with said first user, and
  sending a notification to said first user about a coming telecommunication set up with said second user.

According to another aspect of the invention said method also comprises, after the set up of the telecommunication, the step of modifying the status data corresponding to said telecommunication set up request.

According to a further aspect, the method comprises an additional step to check the availability of said first user before setting up the telecommunication.

According to one embodiment the users registered in a notification status belong to the same internal telecommunication network whereas the users registered in a monitoring status belong to an external telecommunication network.

Furthermore the step of sending a message to said second detected user registered in a monitoring status to inform about the coming telecommunication set up comprises sending a voice message.

Alternatively, the step of sending a message to said second detected user registered in a monitoring status to inform about the coming telecommunication set up comprises sending a text message that can be displayed on a user equipment of said second user.

According to another aspect of the invention the step of modifying the status data corresponding to said telecommunication set up request comprises removing processed requests.

According to a further aspect of the invention the method comprises an additional step for saving processed telecommunication request data and telecommunication set up date and time in a records data repository.

The invention also relates also to an equipment for establishing telecommunication between at least a first and a second users within a telecommunication network comprising:
  a request detection server for receiving and processing telecommunication requests for establishing a telecommunication between a first and a second user,
  a recording server for registering users having a notification status and users having a monitoring status in a telecommunication request data repository,
  a telecommunication traffic analyzer configured on the one hand for monitoring telecommunication activity to determine if the identity of users in telecommunication within the telecommunication network matches with the identity of said second user, and on the other hand for forwarding information about the telecommunication activity of said detected second user to an intervention server and to a notification server, said intervention server being configured for sending a message to said detected second user about a coming telecommunication set up with said first user,
  said notification server being configured for sending a notification to said first user about a coming telecommunication set up with said second user,
  at least one processing mean adapted for setting up a telecommunication between said first and second users when said detected second user is available,
  at least one processing mean adapted for modifying the status data corresponding to said telecommunication set up request in the telecommunication request data repository.

The inventions also relates to a recording server comprising:
  at least one processing mean adapted for receiving, from a request detection server, a telecommunication request for establishing a telecommunication between a first and a second user,
  at least one processing mean adapted for registering status of the users defined in said telecommunication request data repository, at least one processing mean adapted for registering telecommunication requests in a telecommunication request data repository.

Furthermore, another further object of the invention relates to a telecommunication traffic analyzer configured on the one hand for monitoring telecommunication activity to determine if the identity of users in telecommunication within the telecommunication network matches with the identity of said second user, and on the other hand for forwarding information about the telecommunication activity of said detected second user to an intervention server and to a notification server.

According to a further aspect, the telecommunication traffic analyzer comprises at least one processing mean adapted for monitoring telecommunication exchanges between an internal telecommunication network and an external telecommunication network.

Another object of the invention concerns an intervention server comprising at least one processing mean adapted for receiving a demand from a telecommunication traffic analyzer, for intervening in a telecommunication and for superposing a voice message to the telecommunication, and for setting up a telecommunication between a first and a second users.

BRIEF DESCRIPTION OF THE DRAWINGS

FIG. 3 shows a table representing an example of the telecommunication request data repository organization;

FIG. 4 shows a table representing an example of the records data repository organization;

DETAILED DESCRIPTION OF THE INVENTION

As used herein, the terms "server" or "traffic analyzer" refer to parts of a telecommunication network. It may be provided through the use of dedicated hardware as well as hardware capable of executing software in association with appropriate software. It can be a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used herein, the term "internal telecommunication network" refers to a restricted area of a global telecommunication network. Such an internal telecommunication network can be the intranet network of a company. In opposition, the term "external telecommunication network" refers to one or several global networks or a part of said global network which do not comprise the restricted area defined by the internal telecommunication network.

It has also to be noted that the present invention can be used with any fixed or mobile telecommunication network whatever the network standard (WIMAX, 3G LTE, UMTS, GSM, GPRS, EDGE . . . ) or transportation support (radio, fiber optics etc).

The present invention offers to set up telecommunications between users of a telecommunication network. It can be applied to a company working with collaborators from other companies for facilitating the telecommunications between them. It refers to the analysis of telecommunication traffic in order to detect the availability of external collaborators.

Figure 1:
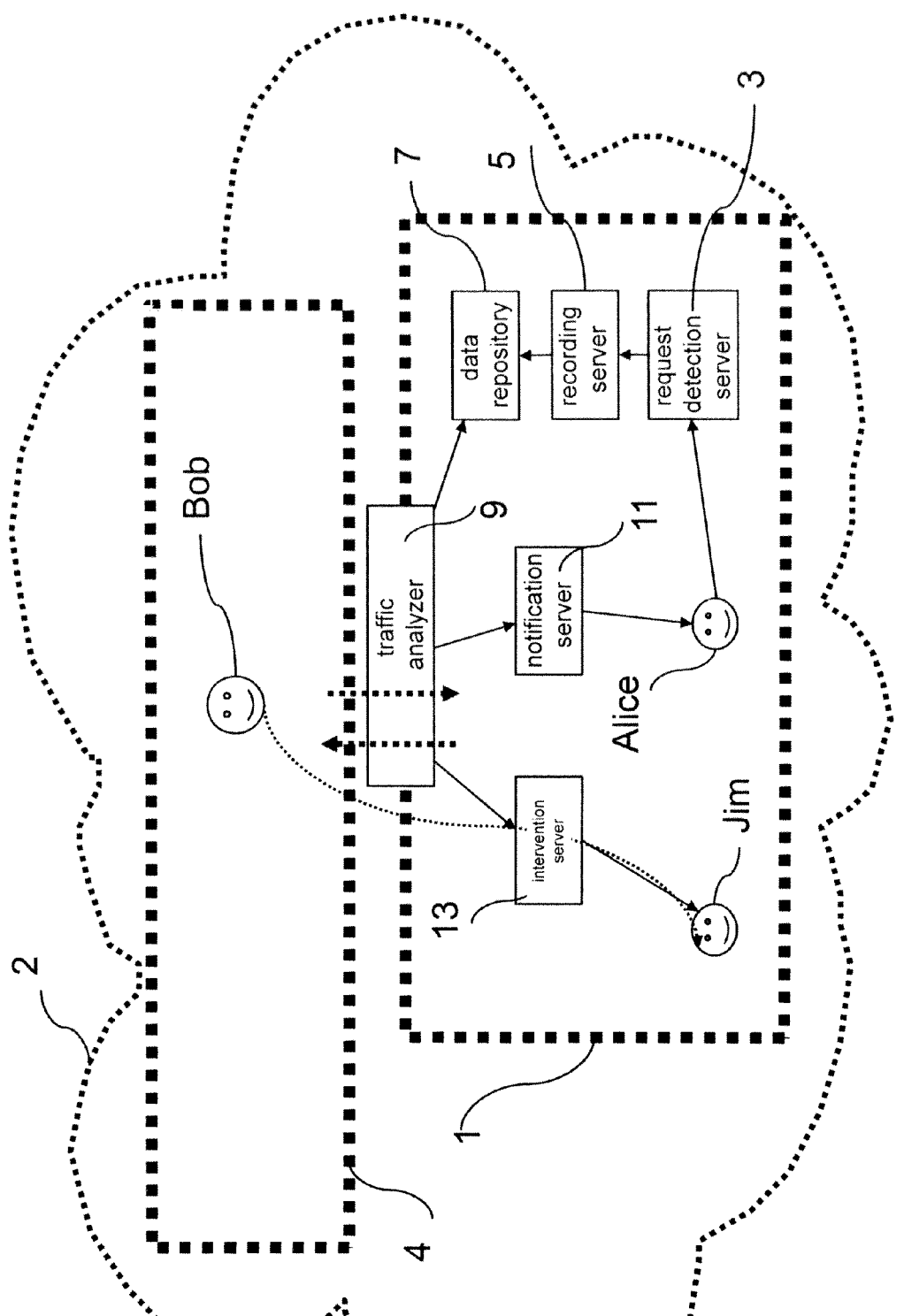
FIG. 1 is a diagram showing in a synoptic way the structure of the equipment according to the present invention.

FIG. 1 shows in a synoptic way the structure of the present invention. It represents an internal telecommunication network 1 being a part of a global telecommunication network 2 comprising a plurality of users as Bob, Jim or Alice, said users being equipped with user telecommunication devices to communicate with each others. In FIG. 1, the user and his equipment are represented as one, that is Jim is not only representing himself as a person but also the associated user telecommunication device (like phone, fixed or mobile, a computer, a PDA etc) that links him to the telecommunication network.

Said internal telecommunication network 1 is linked to an external telecommunication network 4 for outside communications.

The internal telecommunication network 1 can be, for example, the telecommunication network of a company whereas the external telecommunication network 4 is built by the rest or a part of the rest of the global telecommunication network 2.

In order to establish a telecommunication between two users according to the present invention, said internal telecommunication network 1 comprises several devices listed hereafter.

A request detection server 3 is configured to receive a telecommunication request from a user device and to transmit said request to a recording server 5. Such a request comprises at least the identity (name, phone number, IP address . . . ) of the user requesting a telecommunication and the identity of the user needed to be contacted. Additional information can be added to the request if necessary for the telecommunication set up or if required for practical reasons. For example, if the request is made in order to establish a communication for discussing about a subject as a part of a project, the project reference can be attached.

A recording server 5 that is linked to request detection server 3 is configured to receive a telecommunication request from that request detection server 3 and to register the status of the users.

At least two different status are defined, a notification status and a monitoring status.

The notification status is given to the users requesting a telecommunication set up in order to notify them when the telecommunication is coming to be set up.

The monitoring status is given to the users needed to be contacted by said user having a notification status in order to monitor their activity on the telecommunication network and to detect therefore their availability.

Said recording server 5 transmits the telecommunication request to a telecommunication request data repository 7, for example a database, in order to register said telecommunication request.

A telecommunication traffic analyzer 9 is linked to the telecommunication request data repository 7 and is configured to monitor the telecommunication between users in particular users of the internal telecommunication network and users of the external telecommunication network in order to detect the communication activity of an external user with a user of the internal telecommunication network.

More specifically, said telecommunication traffic analyzer 9 is configured to determine the identities of the users of the external telecommunication network in communication with users of the internal telecommunication network and to compare said identities with the identities of the users registered in the telecommunication request data repository 7 with a monitoring status.

Said telecommunication traffic analyzer 9 is also configured to send a demand to an intervention server 13 to inform a user having a monitoring status and being already in communication that a new communication is coming to be set up with another user at the end of the present communication and to send a demand to a notification server II to inform a user having a notification status that his/her requested telecommunication will be set up with the detected user having a monitoring status.

The intervention server 13 receives a demand from said telecommunication traffic analyzer 9 and is configured to inform a user having a monitoring status and detected by said telecommunication traffic analyzer 9 that a telecommunication will be set up with the corresponding user having a notification status.

Such information can be achieved, for example, by sending a voice message superposed to the current conversation of said detected user or by sending a text message displayed on the detected user telecommunication device. Additional information concerning the call and registered in the recording server 5 can also be displayed.

Furthermore, said intervention server 13 is able to set up a telecommunication between said monitoring and notifying users at the end of the current telecommunication of said monitoring user.

The notification server 11 receives a demand from said traffic telecommunication analyzer 9 and is configured to send a notification to said user having a notification status and corresponding to said detected user having a monitoring status and to transmit said notification to said user having a notification status.

To better understand the present invention, a possible application is now described starting from the representation of FIG. 1.

The internal telecommunication network 1 is the internal network of a company comprising employees such as Alice and Jim with their respective telecommunication devices.

For some projects, Alice and Jim work, for example, with an external collaborator Bob. It is supposed that Alice needs to get in touch with Bob and tries to reach him by phone. However Bob was absent during the call attempt of Alice and could therefore not be joined. In this situation, Alice represents a first user needing to call a second user Bob.

With respect to such situation, the present invention offers an option to Alice to be put in telecommunication with Bob even if Bob is currently absent.

It has to be noted that the invention does not require an attempt to reach Bob.

Figure 2:
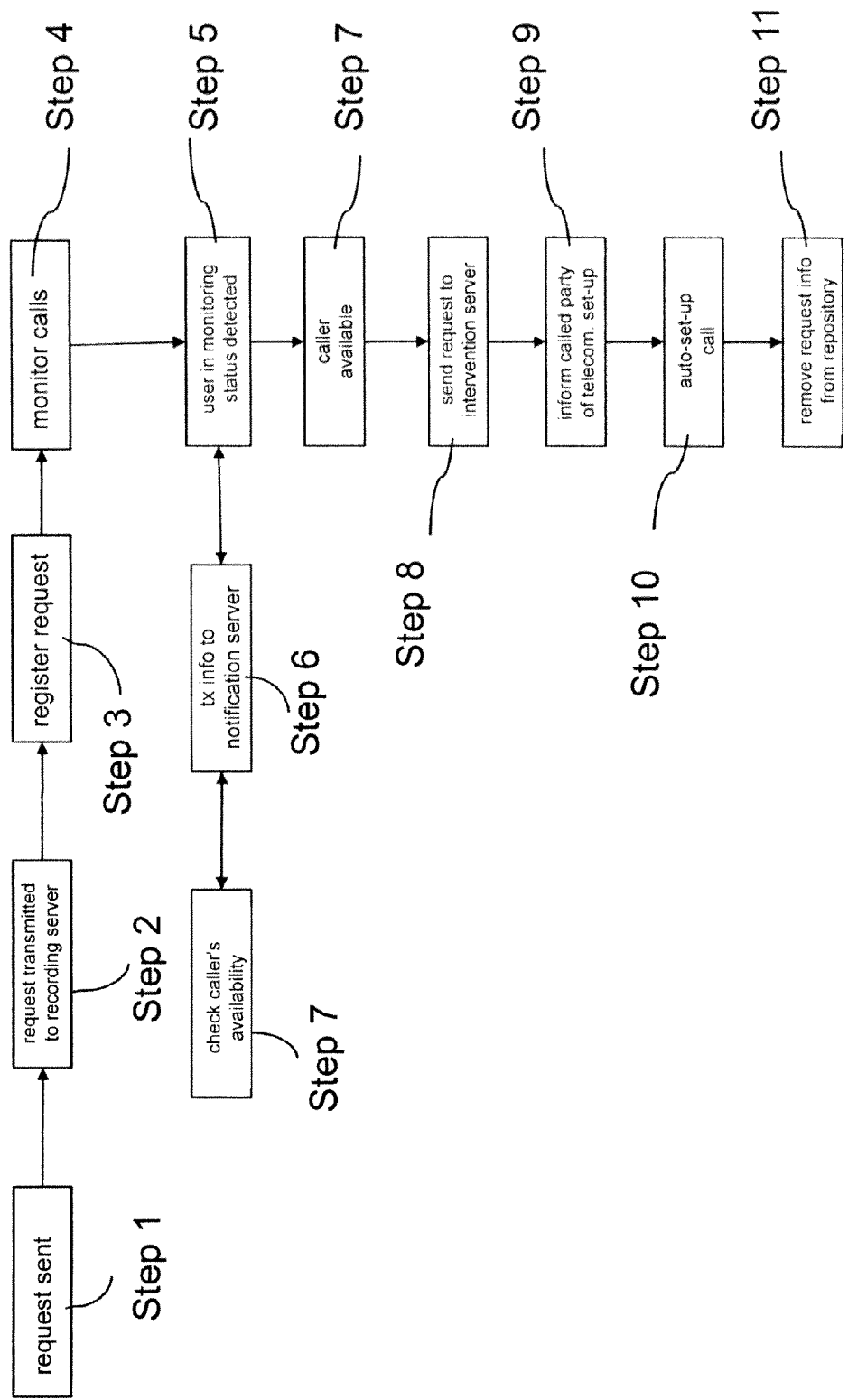
FIG. 2 is a flowchart of the method according to the present invention.

FIG. 2 represents a flowchart of the different steps of the present method.

First, Alice sends, thanks to her user device, a request to the request detection server 3 to be in communication with Bob (step 1). The request is then transmitted to the recording server 5 (step 2) and registered in a telecommunication request data repository 7 (step 3). During the registration, the status of Alice is set as "notify" (notification status) and the status of Bob is set as "monitor" (monitoring status).

FIG. 3 represents a possible organization of the telecommunication request data repository 7 in a table format. Said table comprises several columns comprising the reference of the file or project needing a telecommunication, the identity of the users having a notification and a monitoring status with their personal data (phone number, IP address . . . ), the date of the request and the current status of the telecommunication request process. Additional information can be added if necessary for the company.

The telecommunication traffic analyzer 9 monitors the calls between people who are internal and external to the company and compares the identities of the interlocutors in order to identify the users having a monitoring status in the telecommunication request data repository 7 (step 4).

In case when a user registered in a monitoring status is detected (step 5), for example if Bob calls Jim (or if Jim calls Bob as well), the information is transmitted to the notification server 11 (step 6). Thus, Jim is therefore a third user different from the first user, Alice. In detecting such telecommunication activity of Bob, it can be deduced that Bob might be available too for a phone call with Alice after having finished his conversation with Jim. Before setting up a telecommunication, the notification server 11 will then check the availability of Alice and notifies her that a telecommunication is coming to be set up with Bob at the end of his current call (step 7).

The availability status of Alice is sent to the intervention server 13.

If Alice is not available, the current telecommunication set up process is aborted. The respective status of Alice and Bob remain unamended as notification and monitoring status in the telecommunication request data repository 7 and the status of the request to establish a telecommunication is still pending. Indeed, the detection of Bob by the telecommunication traffic analyzer 9 may occur when Alice is not available anymore, which does not change the fact that she needs to contact Bob.

If Alice is available, the request of the telecommunication between Bob and Alice is sent to the intervention server 13 (step 8). Said intervention server 13 informs Bob that a telecommunication with Alice is coming to be set up at the end of his telecommunication with Jim (step 9). This can be done, for example, by the superposition of a voice message during the telecommunication between Bob and Jim or by displaying a text message on Bob's telecommunication device.

At the end of his communication with Jim, Bob is automatically put in communication with Alice (step 10) through the intervention server 13. The information concerning this request is then removed from the telecommunication request data repository 7 (step 11). Nevertheless, information concerning the different communications can be saved as archives in a records data repository.

The organization of the archived data is presented on FIG. 4. As for the telecommunication request data repository 7, the records data repository is organized in a table format comprising several columns with the details of the telecommunication set up.

It has to be noted that it is an advantage to implement this invention with regard to an internal telecommunication network 1 in order to monitor all the telecommunications with the external telecommunication network 4.

Indeed, external collaborators will in principle not only communicate with one but many persons of that company. Therefore, the present invention offers to take advantage of the multiple calls occurring between each of the external collaborators and their contacts within the company.

If Bob calls directly Alice (or if Alice calls Bob as well), the call is detected by the telecommunication traffic analyzer 9 and the request is also removed from the telecommunication request data repository 7.

Thus, the present invention offers an alternative solution to voice messaging in order to get in communication with a remote collaborator by detecting a call from or to said collaborator and setting up a direct telecommunication at the end of his/her call.

The invention claimed is:

1. Equipment for establishing telecommunication between at least a first user and a second user within a telecommunication network, wherein said equipment comprises:
   a request detection server for receiving and processing telecommunication requests for establishing a telecommunication between a first and a second user who is absent at a time of the request,
   a recording server for registering users having a notification status and users having a monitoring status in a telecommunication request data repository,
   a telecommunication traffic analyzer configured on the one hand for analyzing telecommunication activity to determine if the identity of users in telecommunication within the telecommunication network matches with the identity of said second user, and on the other hand for forwarding information about the telecommunication activity of said detected second user to an intervention server and to a notification server,
   said intervention server being configured for sending a message to said detected second user about a coming telecommunication set up with said first user,
   said notification server being configured for sending a notification to said first user about a coming telecommunication set up with said second user,
   at least one processor adapted to automatically set up a telecommunication between said first and second users when said detected second user is available,
   at least one processor adapted to modify the status data corresponding to said telecommunication set up request in the telecommunication request data repository.

2. A telecommunication traffic analyzer configured on one hand for analyzing telecommunication activity to determine if an identity of a user in telecommunication within the telecommunication network matches with an identity of a second user, said second user having been registered with a monitoring status in a data repository, and on another hand for forwarding information about the telecommunication activity of said detected second user to an intervention server and to a notification server, wherein a telecommunication between a first user and said second user is automatically set-up when said detected second user is available.

3. The telecommunication traffic analyzer in accordance with claim 2 comprising at least one processor adapted to analyze telecommunication exchanges between an internal telecommunication network and an external telecommunication network.

4. The equipment according to claim 1, wherein the notification server is further configured to check the availability of said first user before the setting up of the telecommunication between said first and second users.

5. The equipment according to claim 1, wherein the users registered in a notification status belong to the same internal telecommunication network, and wherein the users registered in a monitoring status belong to an external telecommunication network.

6. The equipment according to claim 1, wherein said message sent by the intervention server to said second detected user comprises a voice message.

7. The equipment according to claim 1, wherein said message sent by the intervention server to said second detected user comprises a text message that can be displayed on a user equipment of said second user.

8. The equipment according to claim 1, wherein the at least one processor adapted to modify the status data corresponding to said telecommunication set up request is configured to remove processed requests from the repository.

9. A method for establishing telecommunication between at least a first and a second users within a telecommunication network, said method comprising:
   receiving and processing telecommunication requests for establishing a telecommunication between a first and a second user who is absent at a time of the request,
   registering users having a notification status and users having a monitoring status in a telecommunication request data repository,
   analyzing telecommunication activity to determine if the identity of users in telecommunication within the telecommunication network matches with the identity of said second user;
   forwarding information about the telecommunication activity of said detected second user to an intervention server and to a notification server,
   sending a message from said intervention server to said detected second user about a coming telecommunication set up with said first user,
   sending a notification from said notification server to said first user about a coming telecommunication set up with said second user,
   automatically setting up a telecommunication between said first and second users when said detected second user is available, and
   modifying the status data corresponding to said telecommunication set up request in the telecommunication request data repository.

10. The method according to claim 9, further comprising:
    checking the availability of said first user before setting up the telecommunication.

11. The method according to claim 9, wherein the users registered in a notification status belong to the same internal telecommunication network whereas the users registered in a monitoring status belong to an external telecommunication network.

12. The method according to claim 9, wherein said sending of a message to said second detected user registered in a monitoring status to inform about the coming telecommunication set up comprises sending a voice message.

13. The method according to claim 9, wherein said sending of a message to said second detected user registered in a monitoring status to inform about the coming telecommunication set up comprises sending a text message that can be displayed on a user equipment of said second user.

14. The method according to claim 9, wherein said modifying of the status data corresponding to said telecommunication set up request comprises removing processed requests.

* * * * *